United States Patent [19]
Carey et al.

[11] Patent Number: 5,455,122
[45] Date of Patent: * Oct. 3, 1995

[54] ENVIRONMENTAL GASOLINE TANK

[75] Inventors: Jay F. Carey, II, Follansbee, W. Va.; Mehrooz Zamanzadeh, Pittsburgh, Pa.

[73] Assignee: The Louis Berkman Company, Steubenville, Ohio

[*] Notice: The portion of the term of this patent subsequent to Jul. 4, 2012 has been disclaimed.

[21] Appl. No.: 373,533

[22] Filed: Jan. 17, 1995

Related U.S. Application Data

[60] Continuation of Ser. No. 254,875, Jun. 6, 1994, abandoned, which is a division of Ser. No. 209,400, Mar. 14, 1994, abandoned, which is a continuation-in-part of Ser. No. 175,523, Dec. 30, 1993, Pat. No. 5,401,586, which is a continuation-in-part of Ser. No. 154,376, Nov. 17, 1993, abandoned, which is a continuation of Ser. No. 42,649, Apr. 27, 1987, abandoned.

[51] Int. Cl.⁶ .................................................. B32B 15/18
[52] U.S. Cl. ..................... 428/659; 428/658; 428/675; 428/679; 428/685; 428/939
[58] Field of Search ..................... 428/659, 685, 428/658, 935, 939, 646, 647, 648, 650, 674, 675; 148/242; 427/433

[56] References Cited

U.S. PATENT DOCUMENTS

| | | | |
|---|---|---|---|
| 84,205 | 11/1868 | Mills | 428/648 |
| 1,989,925 | 2/1935 | Hoover | 148/6 |
| 2,210,593 | 11/1940 | McCullough | 75/175 |
| 2,258,327 | 10/1941 | Kramer | 29/181 |
| 2,374,926 | 5/1945 | Fink | 117/51 |
| 2,533,048 | 12/1950 | Rodgers | 117/52 |
| 2,703,766 | 3/1955 | Ellis | 117/114 |
| 2,806,622 | 9/1957 | Leirer | 220/5 |
| 3,012,310 | 12/1961 | Godfrey | 426/648 |
| 3,058,856 | 10/1962 | Miller | 148/16 |

(List continued on next page.)

FOREIGN PATENT DOCUMENTS

| | | |
|---|---|---|
| 480122 | 4/1992 | European Pat. Off. . |
| 746337 | 5/1933 | France . |
| 1457769 | 9/1966 | France . |
| 2052324 | 3/1971 | France . |
| 2281995 | 8/1974 | France . |
| 2554831 | 5/1985 | France . |
| 2713196 | 10/1978 | Germany . |
| 42-18219 | 9/1967 | Japan . |
| 49-54230 | 5/1974 | Japan . |
| 58-48694 | 3/1983 | Japan ..................................... 425/659 |

(List continued on next page.)

OTHER PUBLICATIONS

"Metal Coatings" *Galvinizing*, p. 35, no date.
"Tinning of Steel" Robert J. Nekervis & Bruce W. Gonser, pp. 709–711, no date.
"Zinc Coatings" W. M. Peirce, pp. 712–714, no date.
"The Tin Industry" *Tin and Tin Alloys*, Bruce W. Gonser, pp. 1063–1070, no date.
"Zinc and Zinc Alloys" Kelton, E. H., pp. 1077–1086, no date.
"Tin–Zinc Alloy Coatings" *Materials & Methods*, pp. 1248–1250, from Tin, Jul. 1946, pp. 9–10.
Metal Coatings, p. 35, McGraw–Hill Encyclopedia of Scient. & Technology Sixth Edition, vol. II.
Erwin Vogelsang et al, Tin & Tin Alloys, pp. 1063–1070, American Society for Metals–Metals Handbook.

(List continued on next page.)

*Primary Examiner*—John Zimmerman
*Attorney, Agent, or Firm*—Vickers, Daniels & Young

[57] ABSTRACT

A corrosion-resistant, environmentally-safe gasoline tank for motor vehicles, wherein the components of the gasoline tank are made of a metal material having a hot-dipped coating of zinc-tin applied to the exposed surfaces of the metal material. The tin-zinc coating includes at least 15 weight percent tin and at least 7 weight percent zinc. The tin-zinc alloy may also include metal additives such as nickel, antimony and/or bismuth.

18 Claims, 1 Drawing Sheet

U.S. PATENT DOCUMENTS

| | | | |
|---|---|---|---|
| 3,231,127 | 1/1966 | Virzi | 220/52 |
| 3,630,792 | 12/1971 | Smyth | 148/6.3 |
| 3,791,801 | 2/1974 | Ariga et al. | 428/639 |
| 3,962,501 | 6/1976 | Ohbu et al. | 420/557 |
| 3,966,564 | 6/1976 | Hyner et al. | 204/43 |
| 4,015,950 | 4/1977 | Galland et al. | 428/648 |
| 4,049,481 | 9/1977 | Morisaki | 428/647 |
| 4,177,326 | 12/1979 | Windal et al. | 428/645 |
| 4,184,928 | 1/1980 | Hoije | 205/252 |
| 4,190,504 | 2/1980 | Usui | 428/648 |
| 4,202,921 | 5/1980 | Enghag | 427/406 |
| 4,321,289 | 3/1982 | Bartsch | 427/287 |
| 4,357,027 | 11/1982 | Zeitlow | 280/5 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |
| 4,814,049 | 3/1989 | Holton et al. | 205/240 |
| 4,879,096 | 11/1989 | Naton | 420/561 |
| 4,969,980 | 11/1990 | Yoshioka et al. | 205/130 |
| 4,999,258 | 3/1991 | Wake et al. | 428/648 |
| 5,114,799 | 5/1992 | Ohashi et al. | 426/685 |
| 5,203,985 | 4/1993 | Nishimura et al. | 205/193 |
| 5,314,758 | 5/1994 | Carey et al. | 428/685 |
| 5,354,624 | 10/1994 | Carey, II | 428/647 |

FOREIGN PATENT DOCUMENTS

| | | |
|---|---|---|
| 59-41430 | 3/1984 | Japan . |
| 59-96238 | 6/1984 | Japan . |
| 60-208465 | 10/1985 | Japan . |
| 528558 | 10/1932 | United Kingdom . |
| 546179 | 1/1942 | United Kingdom . |
| 581604 | 10/1946 | United Kingdom . |
| 796128 | 6/1958 | United Kingdom . |
| 1008316 | 10/1965 | United Kingdom . |
| 1194751 | 6/1970 | United Kingdom . |
| 1513002 | 6/1978 | United Kingdom . |
| 1517454 | 7/1978 | United Kingdom . |
| 2005307 | 4/1979 | United Kingdom . |
| 1588808 | 4/1981 | United Kingdom . |
| 2099857 | 1/1982 | United Kingdom . |
| 2117414 | 10/1983 | United Kingdom . |
| 2265389 | 9/1993 | United Kingdom . |
| 2276887 | 10/1994 | United Kingdom . |

OTHER PUBLICATIONS

English Translation of Kokai Patent Application No. SHO 49 (May 1974) 54230.

"Properties and Selection: Nonferrous Alloys and Special–Purpose Materials", Metals Handbook 10th Ed., vol. 2, pp. 1166–1168, Oct. 1990.

Standard Specification for Solder Metal; pp. 1 & 9, Nov. 1986.

*Metals Handbook*, The American Society for Metals, "Metallic Coatings", pp. 703–721; Surface Treatments pp. 725–732; Tin and Tin Alloys, pp. 1063–1076; Zinc and Zinc Alloys pp. 1077–1092, published 1948, no month.

Van Nostrand's Scientific Encylcopedia, 6th Edition, vol. 1, 1983; pp. 94–96–Definition of "Alloys"; pp. 1322–Definition of Galvanizing, no month.

Van Nostrand's Scientific Encyclopedia, 6th Edition, vol. 11, 1983, pp. 2832–2834–Definition of "Tin"; pp. 3059–3062–Definition of Zinc, no month.

McGraw–Hill Encyclopedia of Science & Technology, 6th Edition, 1987, p. 517, no month.

McGraw–Hill Encyclopedia of Science & Technology, 6th Edition, 1987, pp. 35–37; pp. 44–46, no month.

McGraw–Hill Encyclopedia of Science & Technology, 6th Edition, 1987, pp. 368–372 no month.

McGraw–Hill Encyclopedia of Science & Technology, 6th Edition, 1987, pp. 618–623 no month.

Abstract of Great Britain Patent 2,055,158, Aug. 1983.

Higuchi, et al., "Sn–Zn Alloy Electroplated Steel Sheet for Container of Alchohol Fuel or Alcohol–Containing Fuel", Translation of Kokai 58–48694, Mar. 1983, 11 pages.

Federal Specification QQ–T–201F, 12 Nov. 1986, "Terne-plate, For Roofing and Roofing Products", pp. 1–8.

"Hot Dip Tin Coating of Steel and Cast Iron", Metals Hanbook, 9th Ed. vol. 5, 1983, pp. 351–355, no month.

ENVIRONMENTAL GASOLINE TANK

The present invention is a continuation of abandoned, U.S. patent application Ser. No. 254,875 filed Jun. 6, 1994 entitled "Environmental Gasoline Tank," which is a divisional of abandoned U.S. patent application Ser. No. 209,400 filed Mar. 14, 1994, now abandoned, entitled "Environmental Gasoline Tank," which is a continuation-in-part of U.S. patent application Ser. No. 175,523, now U.S. Pat. No. 5,401,586 issued Mar. 28, 1995 entitled "Architectural Material Coating," which is a continuation-in-part of abandoned U.S. patent application Ser. No. 154,376 filed Nov. 17, 1993 entitled "Roofing Sheet Material Coating," which is a continuation of abandoned U.S. patent application Ser. No. 042,649 filed Apr. 27, 1987 entitled "Roofing Sheet Material Coating."

The present invention relates to the art of coating a metal sheet material and more particularly to the coating of a sheet of steel material with a hot-dipped coating of zinc and tin to be subsequently drawn to form a gasoline tank; however, the invention has much broader applications.

BACKGROUND OF THE INVENTION

In the last several years, there has been a trend in the industry to produce products which are both of a higher quality and environmentally friendly. This is especially true in the automotive industry wherein both consumer groups and environmental organizations have pushed for safer, higher-quality vehicles that are more fuel efficient and less detrimental to the environment. Recycling old vehicles has been one answer to resolving the environmental issues associated with vehicles which have run out their useful life. Automotive salvage markets have developed for these vehicles. The vehicles are partially dismantled and sold as scrap metal wherein the metal is melted down and reformed into various parts. Because of the environmentally-unfriendly nature of lead, the gasoline tanks of vehicles must be removed prior to the recycling of the vehicle. Gasoline tanks are commonly made of carbon or stainless steel coated with a terne coating containing 80% or more lead. As a result, these terne coated gas tanks must be disposed of in dumping yards or landfills. Not only does the terne coated gasoline tank take up space in the landfills, but there is a concern, though unfounded, with the lead leaching from the terne coating into the landfill site and potentially contaminating the surrounding area and underground water reservoirs. The terne coating on the gasoline tank was originally applied to protect the stainless steel or carbon steel tank from corroding. However, the corrosion resistance provided by the terne coating is commonly defective due to the limited coating thickness and coating processes. Standard terne coated gasoline tanks are coated with a 6–8 lb. terne coating (0.0003–0.0004 inch), which is a very thin coating resulting in pinholes in the coating (small uncoated areas on the gasoline tank surface). Due to the thin layer of the terne coating and the pinholes, the coating on the metal sheet, upon being drawn by a die into a gasoline tank component, had a tendency to tear or shear thereby exposing the metal surface. Furthermore, the pinholes in the coating are enlarged as the coated sheet is drawn thereby further exposing more of the metal surface. These exposed surfaces, subjected to the direct environment, readily begin to corrode and over time compromise the structural integrity and safety of the gasoline tank and may ultimately result in the leaking of the gasoline from the tank. The non-uniform coating of the gasoline tank with the terne coating is especially evident when stainless steel is used since terne does not bond as well to the stainless steel as compared to carbon steel.

Metallic coatings such as tin or zinc have been tested as substitutes for terne coatings with limited success. The electroplating of tin or zinc onto metal sheets to be formed into gasoline tanks has not proved to be a reliable and cost effective substitute for terne coatings. Electroplating of tin or zinc forms coating thicknesses which are much thinner than hot-dipped terne coatings thereby making electroplated coatings much more susceptible to tearing or shearing when the electroplated sheet is drawn on a die. Electroplating is also much more expensive and time consuming than a hot-dipped terne process.

Plastic gasoline tanks have been used but with limited success. Although the use of plastic tanks eliminates the environmental concerns associated with lead, the plastic in-of-itself is a non-environmentally-friendly compound which does not readily degrade and therefore must be disposed of in a landfill. The plastic used to make the gasoline tanks is usually not the type that can be recycled. Plastics have also been found to be less reliable than metal gasoline tanks. Specifically, plastic gasoline tanks have a tendency to rupture upon impact, such as from a car accident, whereas a metallic gasoline tank would absorb much of the shock by bending and slightly deforming. Furthermore, the plastic tanks are more susceptible to being punctured from roadside debris since the plastic skin is not as strong or malleable as the skin of a metallic gasoline tank. Plastic gasoline tanks also require new materials, special tools and new assembly methods to fix and install the tanks due to the nature of plastic and its physical properties. These additional costs and shortcomings of plastic tanks have resulted in very little adoption of plastic tanks in present day motor vehicles. Due to the environmental concerns and problems associated with terne coated gasoline tanks and with the shortcomings of plastic gasoline tanks, there has been a demand for a corrosive-resistant, environmentally-safe gas tank which can be easily and safely installed into a vehicle without requiring additional tools and assembly methods and can be subsequently recycled with a vehicle once the useful life of the vehicle has ended.

SUMMARY OF THE INVENTION

The present invention relates to the manufacture of a corrosion-resistant, environmentally-safe petroleum receptacle.

In accordance with the principal feature of the present invention, there is provided a petroleum receptacle such as a gasoline tank for various types of motor vehicles having a first and second sheet metal shell member whereby each shell member includes a drawn cavity surrounded by a peripheral edge. The petroleum receptacle is formed by placing the two shell members together such that the peripheral edges of the shell members abut against each other. The two combined cavities of the shell members combine to form an inner petroleum receiving chamber which holds petroleum within the receptacle. The abutting peripheral edges of the shell members are joined together and sealed to maintain the petroleum within the inner petroleum receiving chamber. The two shell members may be joined in any of a number of ways that will securely prevent the shells from separating and petroleum from leaking from the interior chamber (i.e. welding, soldering and/or bonding the edges together). The petroleum receptacle may include a spout which communicates with the inner chamber of the petroleum receptacle so that the inner chamber can be filled with petroleum. The petroleum receptacle may also include a drain which can be connected to the fuel system of a vehicle.

The corrosive-resistant, environmentally-safe material of which the metal shell members are made is a metal sheet of material forming the base metal of each metal shell member. This metal includes stainless steel, carbon steel, nickel alloys, copper, aluminum, titanium, bronze, etc. "Stainless steel" in the application means a large variety of alloy metals containing chromium and iron. The alloy may also contain other elements such as nickel, carbon, molybdenum, silicon, manganese, titanium, boron, copper, aluminum, nitrogen and various other metals or compounds. Elements such as nickel can be flashed (electroplated) onto the surface of the chromium-iron alloy or directly incorporated into the chromium-iron alloy. The metal sheet has a thickness which is generally less than 0.2 inch so that the metal shell members can be properly drawn over a die to form the metal shell members in the desired shapes.

The metal sheet is coated with a zinc-tin coating applied by a hot dipped process. The zinc-tin coating is a two-phase coating comprising a large weight percentage of zinc and a large weight percentage of tin. The tin content of the two-phase coating is at least 15 weight percent and the zinc content is at least 7 weight percent. Typically, the composition of the zinc-tin metallic coating is less than 35 weight percent tin and at least 65 weight percent zinc. The unique zinc-tin alloy combination provides an excellent corrosion-resistant coating that protects the surface of the metal material from oxidation and is also environmentally friendly thus immune from the prejudices associated with lead containing materials. The zinc-tin coating also provides excellent protection to petroleum receptacle containing petroleum products which include alcohols. Alcohol additives such as methanol or ethanol are commonly added to gasoline to reduce emission problems. These additives are highly corrosive to metals such as carbon steel and stainless steel. The zinc-tin coating provides superior corrosion protection against alcohol additives as compared to terne coated materials. Prior to coating the metal sheet, the exposed surface of the metal sheet is usually pretreated to remove foreign materials and oxides from the metal surface which could interfere with the bonding of the zinc-tin coating onto the metal sheet surface. If the metal sheet surface is stainless steel, a special pretreatment process disclosed in Assignee's abandoned application Ser. No. 08/000,101 filed on Jan. 3, 1993 should be used. The pretreatment of the metal sheet surface allows for a strong bond to be formed between the zinc-tin coating and the surface of the metal sheet. Furthermore, the pretreatment of the metal sheet enables a thicker coating of zinc-tin to be applied to the metal surface.

In accordance with another aspect of the invention, nickel may be added to the zinc-tin coating. Nickel has been found to provide addition corrosion protection especially against alcohol products or alcohol additives. The amount of nickel added to the zinc-tin coating is controlled so as not to make the zinc-tin coating too difficult to form in a die.

In accordance with still another aspect of the invention, bismuth and antimony may be added to the zinc-tin coating to inhibit the crystallization of the tin in adverse environmental conditions. When tin crystallizes, the bonding of the tin-zinc coating to the metal sheet may weaken resulting in flaking of the coating. The addition of small amounts of bismuth and/or antimony in amounts of at least 0.05 weight percent prevents crystallization of the tin. Bismuth and/or antimony may be added in larger quantities to also enhance the hardness and strength of the zinc-tin coating to increase the resistance to wear of the coating.

In accordance with another feature of the present invention, the zinc-tin coating is lead-free or essentially lead-free. The lead content is maintained at extremely low levels and not to exceed 0.05 weight percent. Preferably, the lead content is maintained at much lower weight percentage levels so as to dispense with any environmental concerns associated with the zinc-tin coating.

In accordance with still another aspect of the present invention, the metal sheet is plated with a nickel barrier prior to applying the zinc-tin coating to provide additional corrosion resistance, especially against halogens such as chlorine. The nickel barrier is applied to the metal sheet in a thin layer. Although the zinc-tin coating provides excellent protection against most corrosion-producing elements and compounds, compounds such as chlorine have the ability to eventually penetrate the zinc-tin coating and attack and oxidize the surface of the metal sheet thereby weakening the bond between the metal sheet and the zinc-tin coating. The nickel barrier has been found to provide an almost impenetrable barrier to these elements and/or compounds which in fact penetrate the zinc-tin coating. Due to the very small amount of these compounds penetrating the zinc-tin coating, the thickness of the nickel barrier can be maintained at small thicknesses while still maintaining the ability to prevent these components from attacking the metal sheet material. The zinc-tin coating and thin nickel coating effectively complement one another to provide superior corrosion resistance. The nickel barrier does not adversely affect the bonding of the zinc-tin coating since the coating strongly bonds to nickel.

In accordance with another aspect of the present invention, the zinc-tin coating is applied to the surface of the metal sheet at a thickness of about 0.0003–0.05 inch. A coating thickness of 0.002 (40 lbs.) forms a zinc-tin coating with virtually no pinholes in the coating and resists tearing when the coated metal sheet is drawn into a gasoline tank shell member. The thickness of the zinc-tin coating on the metal sheet essentially eliminates uncovered areas on the surface of the metal sheet that are commonly found with thinner coatings. The additional coating thickness of the zinc-tin coating allows for greater elongation characteristics as compared to thinner coatings, resulting in the maintaining of a coating on the surface of the metal sheet during and after the metal sheet has been drawn by a die to form the respective members of the petroleum receptacle. The thicker coating also provides for additional corrosion resistance and a higher quality product.

In accordance with still yet another aspect of the present invention, the first and second sheet metal shell members are joined together by welding or soldering the two members together. The electrode and/or solders used to join the shell members are lead free so as not to introduce lead to the petroleum receptacle.

The primary object of the present invention is the provision of a petroleum receptacle which is both corrosion-resistant and environmentally-safe.

Another object of the present invention is the provision of a petroleum receptacle that contains essentially no lead.

Yet another object of the present invention is the provision of a petroleum receptacle which is coated with a layer of zinc-tin.

Still another object of the present invention is the provision of coating a metal sheet with a zinc-tin coating containing controlled amounts of nickel.

Another object of the present invention is the provision of applying a thin nickel barrier to the surface of the metal sheet prior to applying the zinc-tin coating.

Still yet another object of the present invention is the provision of coating the metal sheet material with a sufficient coating thickness which eliminates pinholes in the coating and does not shear when the sheet material is drawn in a die.

Another object of the present invention is the provision of a petroleum receptacle which is joined together by a lead-free electrode and/or a lead-free solder.

These and other objects and advantages will become apparent to those skilled in the art upon reading the following description and taken together with the accompanying drawings.

DESCRIPTION OF THE PREFERRED EMBODIMENT

Figure 1:
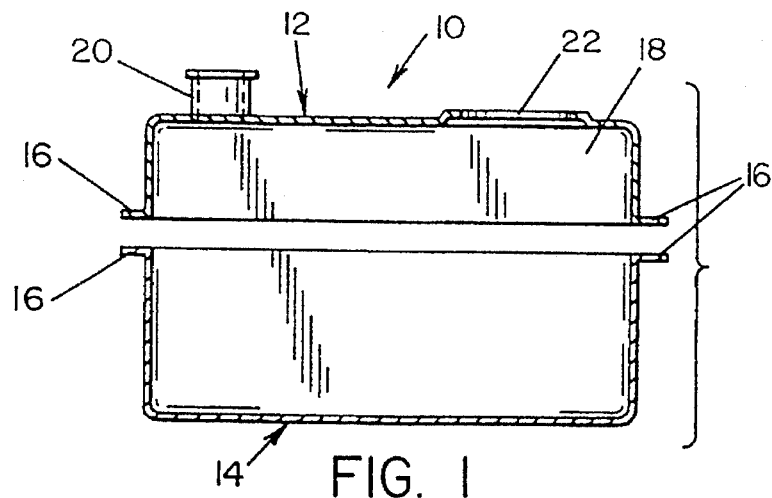
FIG. 1 is a plane view of a gasoline tank of the present invention.

Referring now to the drawings wherein the showings are for the purpose of illustrating the preferred embodiments of the invention only and not for the purpose of limiting the same, reference is first had to FIG. 1 which, as noted above, illustrates a gasoline tank of the present invention. Gasoline tank 10 is made up of two shell members 12 and 14. The shell members are each shaped in a die by placing a sheet of zinc-tin coated metal sheet material on the die and drawing the sheet material over the die. The shells are preferably formed in a cylindrical shape and each have a peripheral edge 16. The two shells are joined together at the respective peripheral edges to form an inner gasoline receiving chamber 18 wherein the gasoline is stored within the tank. Gasoline tank 10 also contains a spout 20 which communicates with interior chamber 18 of the gasoline tank so that gasoline can be inserted into the inner chamber. Preferably, the spout is inserted at the top portion of shell 12 for easy insertion of the gasoline into the tank. Gasoline tank 10 also contains a drain hole 22 which communicates the interior of the gasoline tank chamber with the fuel system of the motor vehicle. Preferably, drain hole 22 is located at the top of the gasoline tank on shell 12. Generally, a fuel pump is located in the inner chamber of the gasoline tank and pumps the gasoline through the vehicle's fuel system.

Figure 2:
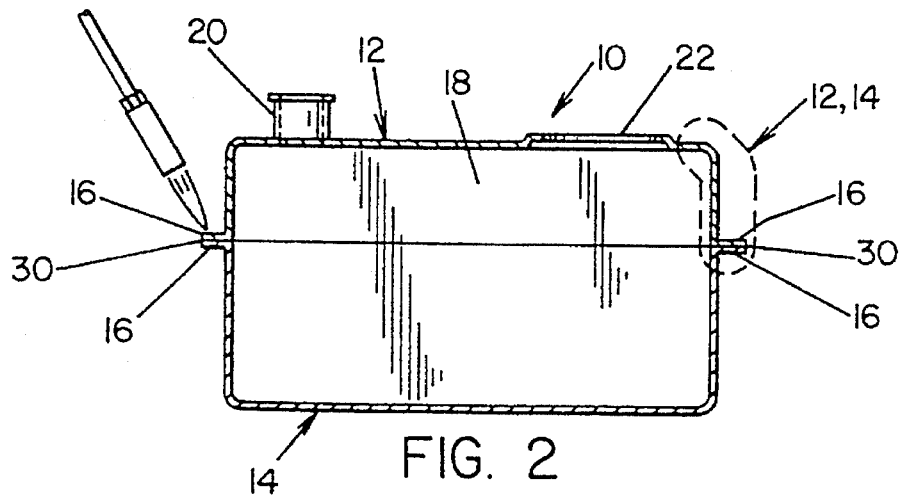
FIG. 2 illustrates the joining of the first and second shell members of the gasoline tank at the peripheral edges.

As illustrated in FIG. 2, shell members 12 and 14 are joined together by abutting peripheral edges 16 of the respective shell members together and subsequently soldering the shell members together with a lead-free solder. Spout 20 and drain hole 22 are also soldered to the shell member with a lead-free solder. The lead-free solder is used so as not to add any lead to the gasoline tank thereby maintaining the environmental safeness of the gasoline tank and not compromising the recyclability of the gasoline tank. Preferably, the lead-free solder is a solder comprised of essentially tin so that the solder complements the zinc-tin coating on the gasoline tank thereby assisting in the corrosion protection of the gasoline tank.

Figure 3:
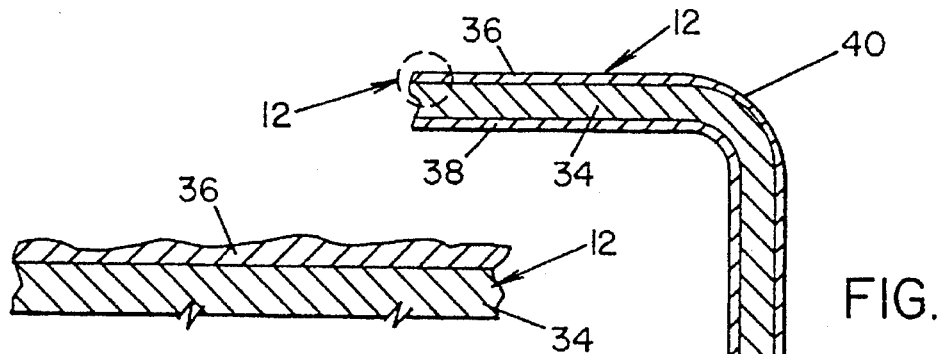
FIG. 3 is a partial cross-sectional view of a gasoline tank illustrating the zinc-tin coating on the metal shell after the coated metal shell has been drawn.

Referring now to FIG. 3, each shell member includes an outer zinc-tin coating 36 and an inner zinc-tin coating 38 which have essentially the same thickness. Prior to applying the zinc-tin coating to metal sheet 34, the exposed surface of the sheet is preferably pre-treated. Proper pretreatment of the metal sheet results in proper bonding of the zinc-tin coating to the metal steel and results in thicker and/or more uniform zinc-tin metal coatings. Standard pretreatment processes to remove foreign materials (i.e. oil, glue, paper, dirt, etc) can be used for carbon steel materials. If the metal sheet is stainless steel, a special pretreatment process which includes aggressively pickling, chemically activating and maintaining the metal sheet in a low oxygen environment as disclosed in application Ser. No. 08/000,101 filed Jan. 4, 1993 should be used.

After the metal sheet is pretreated, the sheet is coated with a zinc-tin coating. The zinc-tin coating is preferably applied by a hot-dipped process; however, an air knife process could be used. Both the pretreatment of the metal sheet and the coating of the metal sheet are preferably carried out in a continuous process; however, a batch process may be used.

The zinc-tin metallic coating is a two-phase metallic coating. The metal sheet materials which the zinc-tin coating is preferably carbon steel, but can be other metals. The zinc-tin coating forms a highly corrosion-resistant coating that reduces the corrosion of the metal sheet material when exposed to the atmosphere. The zinc-tin coating contains a large weight percentage of zinc and essentially the balance of tin. It has been discovered that by adding zinc to tin, the corrosion resistance of the two-phase coating is equal to or greater than tin or terne coatings. Preferably, the zinc weight percentage is at least 65% and can be as much as 85% of the tin-zinc coating. The tin content within the coating essentially makes up the balance of the coating. The tin content preferably is from 15–35 weight percent of the zinc-tin coating. The zinc-tin coating is electroprotective under oxidizing conditions which inhibits oxidation of exposed the metal sheet near the zinc-tin coating. As a result, minor discontinuities in the zinc-tin coating do not result in oxidation of the exposed metal sheet, a contrary result if only a tin or terne coating is used.

The zinc-tin coating may contain controlled amounts of nickel to increase the corrosion resistance of the coating especially in environments containing alcohol. Gasohol products for motor vehicles are becoming more popular since such products are perceived as a useful way to control vehicle emissions. These alcohol containing products are highly corrosive to the carbon steel sheet material. The zinc-tin coating provides superior protection against the alcohol containing products as compared to terne coatings. The addition of nickel to zinc-tin coating provides additional corrosion protection against alcohol containing products. The nickel content of the zinc-tin coating preferably does not exceed 1.0 weight percent of the coating. Typically, the nickel content ranges between 0.3–0.9 weight percent and preferably about 0.7 weight percent.

The zinc-tin coating may also contain small amounts of other metals to modify the physical properties of the zinc-tin two-phase coating; however, these secondary metal components contribute primarily to the strength and crystallization resistance of the coating and not to the corrosion-resistant properties of the coating. The zinc-tin coating may contain bismuth and antimony to increase the strength of the coating and also to inhibit the crystallization of the tin at lower temperatures. Antimony and/or bismuth in amounts at least as low as 0.05 weight percent have been found to be effective in inhibiting tin crystallization. It is believed that the high levels of zinc also help stabilize the tin within the coating. Antimony and/or bismuth in weight percentages greater than 0.5% are primarily added to harden and/or strengthen the coating. Small amounts of other metals, such as iron or copper, may be added to the coating to strengthen and/or increase the pliability of the coating. These other types of metals typically constitute very small weight percentages within the coating and generally do not exceed more than 2% of the coating and preferably are less than 1% of the coating.

The zinc-tin coating is primarily composed of tin and zinc and contains little, if any, lead thus making the coating essentially lead free and environmentally friendly. The lead content, if any, is maintained at extremely low levels within the metallic coating. The amount of lead in the coating is maintained such that no more than 0.05 weight percent is present in the coating. Preferably, the lead content in the coating is maintained at levels less than 0.01 weight percent. The limiting of lead content in the coating eliminates any concerns associated with the leaching of the lead from the coating and the environmental concerns associated with products containing lead.

The inventors have discovered that if the metal sheet material is plated with a thin nickel layer prior to coating the material with the zinc-tin coating, the metal sheet material exhibits improved corrosion resistance in acidic environments. If a nickel layer is to be applied, the nickel layer is preferably plated to the metal sheet material by an electrolysis process; however, an air knife or hot-dipped process could be used. The thickness of the layer is maintained such that it preferably is not more than 3 microns ($1.18 \times 10^{-4}$ in.) thick and preferably has a thickness which ranges between 1–3 microns. The bond between the zinc-tin coating and the nickel layer is surprisingly strong and durable and thereby inhibits the zinc-tin coating from flaking especially when the metal sheet material is formed into the gasoline tank.

The large zinc content of the two-phase zinc-tin coating has not been previously used, especially on materials for gasoline tanks. The bonding of the zinc-tin coating to metal sheet materials is surprisingly strong and forms a durable protective coating which is not easily removable, thereby resisting flaking of the coating.

Examples of the two-phase zinc-tin coating which have exhibited the desired characteristics as mentioned above are set forth as follows:

| Alloy Ingredients | A | B | C | D |
|---|---|---|---|---|
| Tin | 15 | 20 | 30 | 20 |
| Antimony | ≦7.5 | ≦7.5 | ≦7.5 | ≦7.5 |
| Bismuth | ≦1.7 | ≦1.7 | ≦1.7 | ≦1.7 |
| Iron | ≦0.1 | ≦0.1 | ≦0.1 | ≦0.1 |
| Copper | ≦2.0 | ≦2.0 | ≦2.0 | ≦2.0 |
| Lead | ≦0.05 | ≦0.05 | ≦0.05 | ≦0.05 |
| Nickel | ≦1.0 | ≦1.0 | ≦1.0 | ≦0.7 |
| Zinc | Bal. | Bal. | Bal. | Bal. |

Generally, the formulations of the zinc-tin coating include in weight percentage amounts; 65–85% zinc, 0–0.5% antimony, 0–0.5% bismuth, 15–35% tin, 0.0–1.0% nickel and less than 0.01 lead.

The zinc-tin coated metal sheets are formed into shell members 12 and 14 by placing the coated sheet on a die and then drawing the coated sheet over the die to form a metal shell member with a drawn cavity. As illustrated in FIG. 3, when the coated sheet is drawn over the die, the forming of the coated sheet forces the zinc-tin coating to become elongated about the outer peripheral edge corner 40. When the zinc-tin coating is elongated, the coating begins to reduce in thickness. If the coating is too thin, the coating will tear or shear and expose the unprotected surface of the metal sheet. Preferably, the coating on the metal sheet 34 is at least 0.01 inch thick so that when the zinc-tin metallic coating is elongated while being shaped in the die, coating 36 will not shear at peripheral corner 40 and expose the surface of the sheet.

Figure 5:
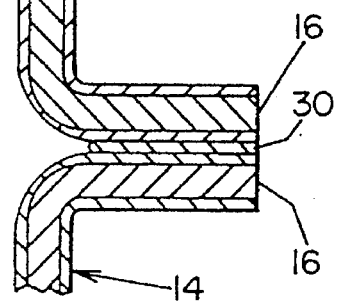
FIG. 5 is a prior art illustration of prior metal coating thickness on a metal sheet material.

As illustrated in FIG. 5 prior metal coatings on metal sheets having the equivalent of about a 6–8 lb. coating on the metal sheets (0.0004 inch thick coating) have a tendency to tear apart or shear at peripheral edge 40 when the shell members are drawn on the die. In addition, the thicknesses of the prior metal coatings were inadequate to prevent pinholes 42 from existing on the metal sheet after coating. These pinholes significantly enlarged when the coating began to elongate at peripheral edge 40 while being drawn on the die. As a result of the expansion of the pinholes and/or tearing or shearing of the coating at peripheral edge 40 of prior metal coated sheets, various surfaces of the coated sheets were directly exposed to the atmosphere resulting in accelerated corrosion of the gasoline tank at the exposed areas.

Figure 4:
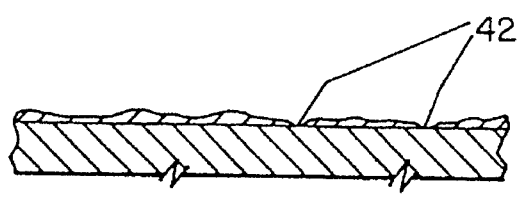
FIG. 4 is an enlarged view of the zinc-tin coating thickness of the present invention on a metal sheet.

As illustrated in FIG. 4, the zinc-tin coating on the metal sheet material of the present invention is significantly thick to overcome these past shortcomings of thinner coatings. The coating thickness is preferably at least 0.01 inch thick to eliminate pinholes. As a result, the problems associated with the expansion of pinholes and the shearing or tearing of the zinc-tin coating during the forming of the gasoline tank in a die are essentially eliminated thereby increasing the corrosion protection to the gasoline tank.

The invention has been described with reference to a preferred embodiment and alternatives thereof. It is believed that the many modifications and alterations to the embodiment discussed herein will readily suggest themselves to those skilled in the art upon reading and understanding the detailed description of the invention. It is intended to include all such modifications and alterations insofar as they come within the scope of the present invention.

We claim:

1. A coated metal strip for use in a petroleum receptacle, said strip being coated by a continuous hot dip process with a low reflecting, highly corrosive-resistant, two-phase tin-zinc metallic coating alloy especially for corrosive environments, said coating comprising a majority of zinc and having about 0.3–1.0 percent nickel by weight and at least 15 percent tin by weight.

2. A coated metal strip as defined in claim 1, wherein said metallic coating includes at least 0.05 weight percent metallic stabilizer.

3. A coated metal strip as defined in claim 1, wherein said metal material is a metal selected from the group consisting of carbon steel, stainless steel and copper.

4. A coated metal strip as defined in claim 3, wherein said nickel layer thickness does not exceed three microns.

5. A coated metal strip as defined in claim 1, wherein said coating comprises:

| | |
|---|---|
| Tin | 15.0–35.0% |
| Zinc | 65.0–85.0% |
| Nickel | 0.3–1.0% |
| Bismuth | 0.0–1.7% |
| Antimony | 0.0–7.5% |
| Iron | 0.0–0.1% |
| Lead | 0.0–0.05% |
| Copper | 0.0–2.0% |

6. A coated metal strip as defined in claim 5, wherein said metallic coating includes at least 0.05 weight percent metallic stabilizer.

7. A coated metal strip as defined in claim 6, wherein said nickel content ranges from 0.3–0.9.

8. A coated metal strip as defined in claim 7, wherein said nickel content is about 0.7 weight percent.

9. A coated metal strip as defined in claim 6, wherein said lead is less than 0.01 weight percent of said coating.

10. A coated metal strip as defined in claim 5, wherein said nickel content ranges from 0.3–0.9.

11. A coated metal strip as defined in claim 5, wherein said lead is less than 0.01 weight percent of said coating.

12. A coated metal strip as defined in claim 5, wherein the surface of said metal material is plated with a thin nickel layer prior to applying said two-phase metallic coating.

13. A stainless steel strip especially for corrosive environments with a hot-dipped continuously applied alloy coating of less than 0.05 inches to provide an additional corrosive-resistant surface on said stainless steel strip, said alloy coating comprising a majority of zinc, at least 15 percent by weight tin and about 0.3–1.0 percent nickel by weight.

14. A stainless steel strip as defined in claim 13, wherein said alloy includes a majority of zinc.

15. A stainless steel strip as defined in claim 13, wherein said alloy also includes up to 2.0 percent by weight copper.

16. A steel strip with a hot-dipped continuously applied alloy coating of less than 0.05 inches to provide an additional corrosive-resistant surface on said steel strip, said alloy coating comprising a majority of zinc, at least 15 percent by weight tin and about 0.3–1.0 percent nickel by weight.

17. A steel strip as defined in claim 16, wherein said alloy also includes a metallic stabilizer.

18. A steel strip as defined in claim 16, wherein said alloy also includes up to 2.0 percent by weight copper.

* * * * *

Disclaimer 5,455,122 - Jay F. Carey, II, Follansbee, W. Va; Mehrooz Zamanzadeh, Pittsburgh, Pa. ENVIRONMENTAL GASOLINE TANK. Patent dated Oct. 3, 1995. Disclaimer filed Oct. 26, 1998, by the assignee, The Louis Berkman Company.

The term of this patent shall not extend beyond the expiration date of Pat. No. 5,401,586.
*(Official Gazette,* June 1, 1999)

UNITED STATES PATENT AND TRADEMARK OFFICE
CERTIFICATE OF CORRECTION

PATENT NO.    : 5,455,122
DATED         : October 3, 1995
INVENTOR(S)   : Carey et al.

It is certified that error appears in the above-identified patent and that said Letters Patent is hereby corrected as shown below:

<u>Title page,</u>
Item [60], change the date of "Apr. 27, 1987" to -- Apr. 5, 1993 --.

<u>Column 1,</u>
Line 15, change "Apr. 27, 1987" to -- Apr. 5, 1993 --.

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.   : 5,455,122
DATED        : October 3, 1995
INVENTOR(S)  : Carey et al.

It is certified that error appears in the above-identified patent and that said Letters Patent is hereby corrected as shown below:

Title page,
Item [60], Related U.S. Application Data, please add -- Ser. No. 08/142,649, Apr. 5, 1993, abandoned. --

Signed and Sealed this

Twenty-first Day of September, 2004

JON W. DUDAS
*Director of the United States Patent and Trademark Office*